United States Patent [19]

Trommer

[11] Patent Number: 5,040,654
[45] Date of Patent: Aug. 20, 1991

[54] MANUAL CONNECT-DISCONNECT COUPLING

[75] Inventor: William C. Trommer, Rockford, Ill.

[73] Assignee: Sundstrand Corporation, Rockford, Ill.

[21] Appl. No.: 431,397

[22] Filed: Nov. 3, 1989

[51] Int. Cl.[5] .................. F16D 11/00; F16D 43/02
[52] U.S. Cl. .................. 192/114 R; 192/67 R; 192/101
[58] Field of Search ........... 192/114 R, 67 R, 995, 192/101

[56] References Cited

U.S. PATENT DOCUMENTS

| | | | |
|---|---|---|---|
| 3,164,235 | 1/1965 | Seelig et al. | 192/101 |
| 4,349,092 | 9/1982 | Geisthoff | 192/67 R |
| 4,434,881 | 3/1984 | Denk et al. | 192/101 |
| 4,684,000 | 8/1987 | Brown | 192/114 R |
| 4,869,354 | 9/1989 | Brazier | 192/67 R |

Primary Examiner—Leslie A. Braun
Assistant Examiner—Andrea Pitts
Attorney, Agent, or Firm—Wood, Phillips, Mason, Recktenwald & VanSanten

[57] ABSTRACT

Difficulties in interrupting a mechanical power transmission path may be minimized in a manual connect-disconnect operator which includes a coupling shaft (38) and a translatable carrier (28) journalling the coupling shaft (38) for rotation about an axis and mounting the coupling shaft (38) for axial movement along the axis between connect and disconnect positions. A yoke (52) is mounted on a pivot (54) and is connected to the carrier (28) for translating the carrier (28) to move the coupling shaft (38) upon pivotal movement of the yoke (52). A manual actuator (78) is mounted for reciprocating movement and a detent mechanism (92), (94), (100), (102), (104), (106), (108) is operable to maintain the carrier (28) in either of the positions.

11 Claims, 6 Drawing Sheets

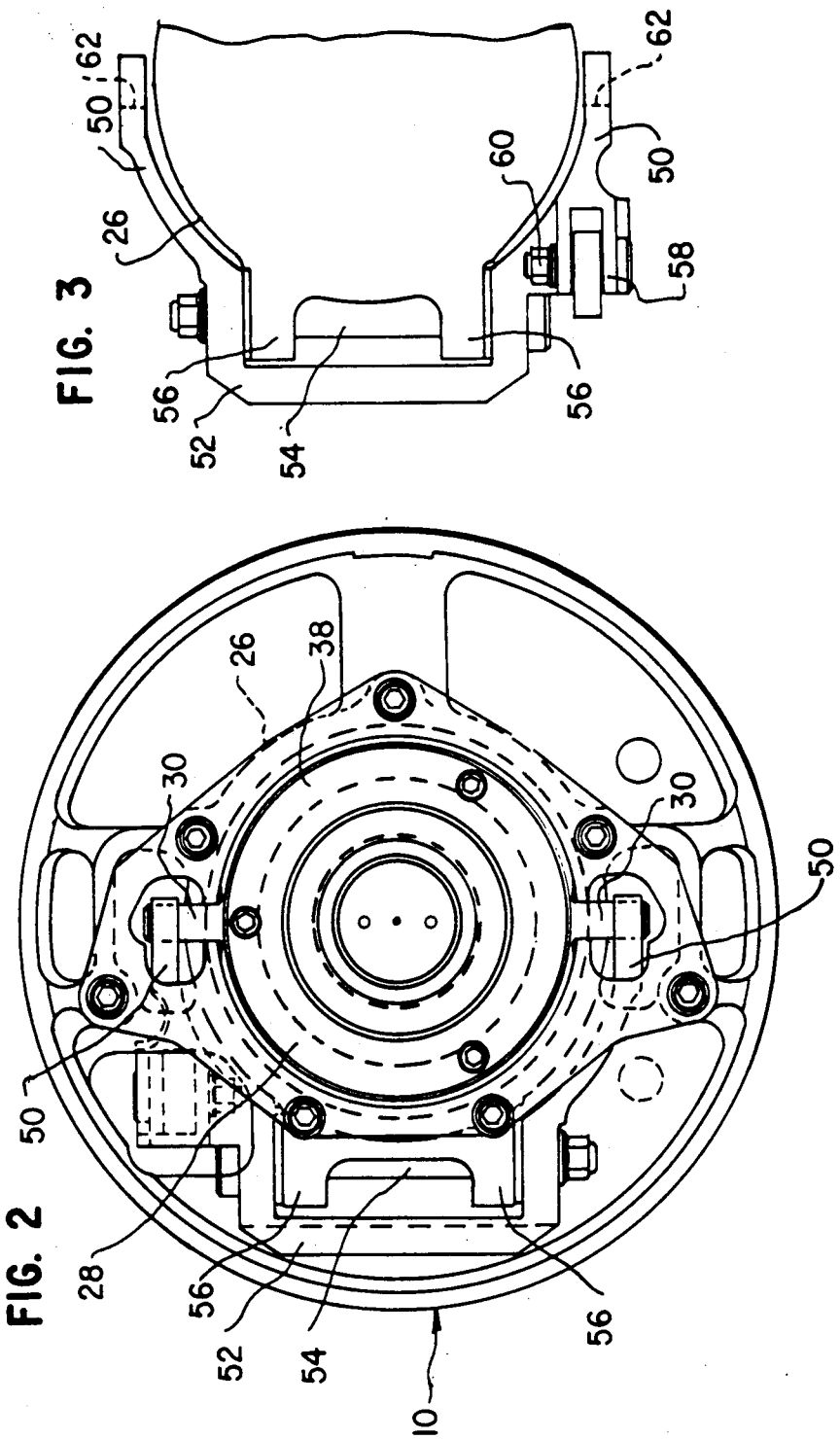

MANUAL CONNECT-DISCONNECT COUPLING

FIELD OF THE INVENTION

This invention relates to a manually operated connect-disconnect coupling that may be utilized in a mechanical power transmission path.

BACKGROUND OF THE INVENTION

There are a large variety of apparatus that require the presence of some sort of means whereby a mechanical power transmission path, frequently between two rotary elements, may be selectively interrupted. That is to say, it is desirable to provide some sort of coupling mechanism whereby the rotary elements may be connected or disconnected.

Clutches are often used for the purpose but clutches are subject to wear and slippage when worn. In those instances where the elements are to be connected or disconnected only when the apparatus including the coupling is in a quiescent form, a clutch is not even necessary.

A typical example of an apparatus requiring a nonclutch type of connect-disconnect coupling is a so-called AMAD which is the accessory drive unit for driving hydraulic pumps, electrical generators, etc. by means of a power takeoff from an aircraft main turbine engine. Frequently, ground servicing will require that the accessories as mentioned above be checked and it is desirable that the mechanical connection between such accessories in the main engines be interrupted to facilitate servicing, inspection, or the like.

As is well known, AMADs and the associated auxiliary or accessory devices are most often housed in aerodynamically shaped engine cowlings where space is at a premium. Thus, it is desirable that a connect-disconnect coupling for use in an AMAD be simple in construction, easy to operate and be readily accessible. The present invention is directed to accomplishing those goals.

SUMMARY OF THE INVENTION

It is the principal object of the invention to provide a new and improved manually operated connect-disconnect coupling for use in a mechanical power transmission path.

An exemplary embodiment of the invention achieves the foregoing object in a structure including a coupling member, a translatable carrier journalling the coupling member for rotation about an axis and mounting the coupling member for axial movement along the axis between connect and disconnect positions, and a throw out element connected to the carrier for translating the carrier to move the coupling member upon movement of the throw out member. Preferably, the throw out member is a pivoted yoke.

Also included is a manual actuator mounted for reciprocating movement and detent means operable to maintain the carrier in either of the two positions. A reciprocal release mechanism is provided for the detent means and is carried by the actuator. A reciprocating motion to rotary motion converting mechanism interconnects the actuator and the yoke such that reciprocating movement of the actuator converts to pivotal movement of the yoke to translate the carrier between the two positions.

In a preferred embodiment, the detent means is a ball detent mechanism and in a highly preferred embodiment of the invention, the manual actuator is hollow and includes a radial hole. A ball is movable in the hole and a guide sleeve receives the actuator and mounts the same for the reciprocating movement thereof. The sleeve includes two spaced recesses, each alignable with the hole to partially receive the ball. The release mechanism is reciprocable to urge the ball into a selected one of the recesses and to allow the ball to be cammed from either of the recesses into the hole to provide a releasable detent action.

In a highly preferred embodiment, the release mechanism comprises a release rod reciprocably received within the hollow of the actuator and having a recess alignable with the hole oppositely of the guide sleeve recesses to allow the ball to be cammed therefrom. The rod, when the release rod recess is not aligned with the hole, urges the ball into one of the guide sleeve recesses and positively retains the same therein to provide positive detent action.

In a highly preferred embodiment, a spring interconnects the release rod and the actuator and biases the release rod so as to move the release rod recess out of alignment with the hole.

The invention further contemplates that the actuator terminate in a handle and that the release rod terminate in a button within the handle so that operation of the actuator and the release mechanism may be performed with but a single hand.

The invention further contemplates that the reciprocating motion to rotary motion converting mechanism include a pivoted lever having an end slidably and pivotally connected to the actuator. In a highly preferred embodiment, the yoke is an arm of a bell crank and a second actuating arm is slidably and pivotally connected to the lever.

In a preferred embodiment, the lever has slotted ends which receive pins respectively on the actuating arm of the belt crank and on the actuator to provide the desired connections.

Other objects and advantages will become apparent from the following specification taken in connection with the accompanying drawings.

DESCRIPTION OF THE DRAWINGS

FIG. 2 is a sectional view taken approximately along the line 2—2 in FIG. 1 and rotated 90°;

FIG. 3 is a view similar to FIG. 2 but with a number of components broken away for clarity;

DESCRIPTION OF THE PREFERRED EMBODIMENT

Figure 1:
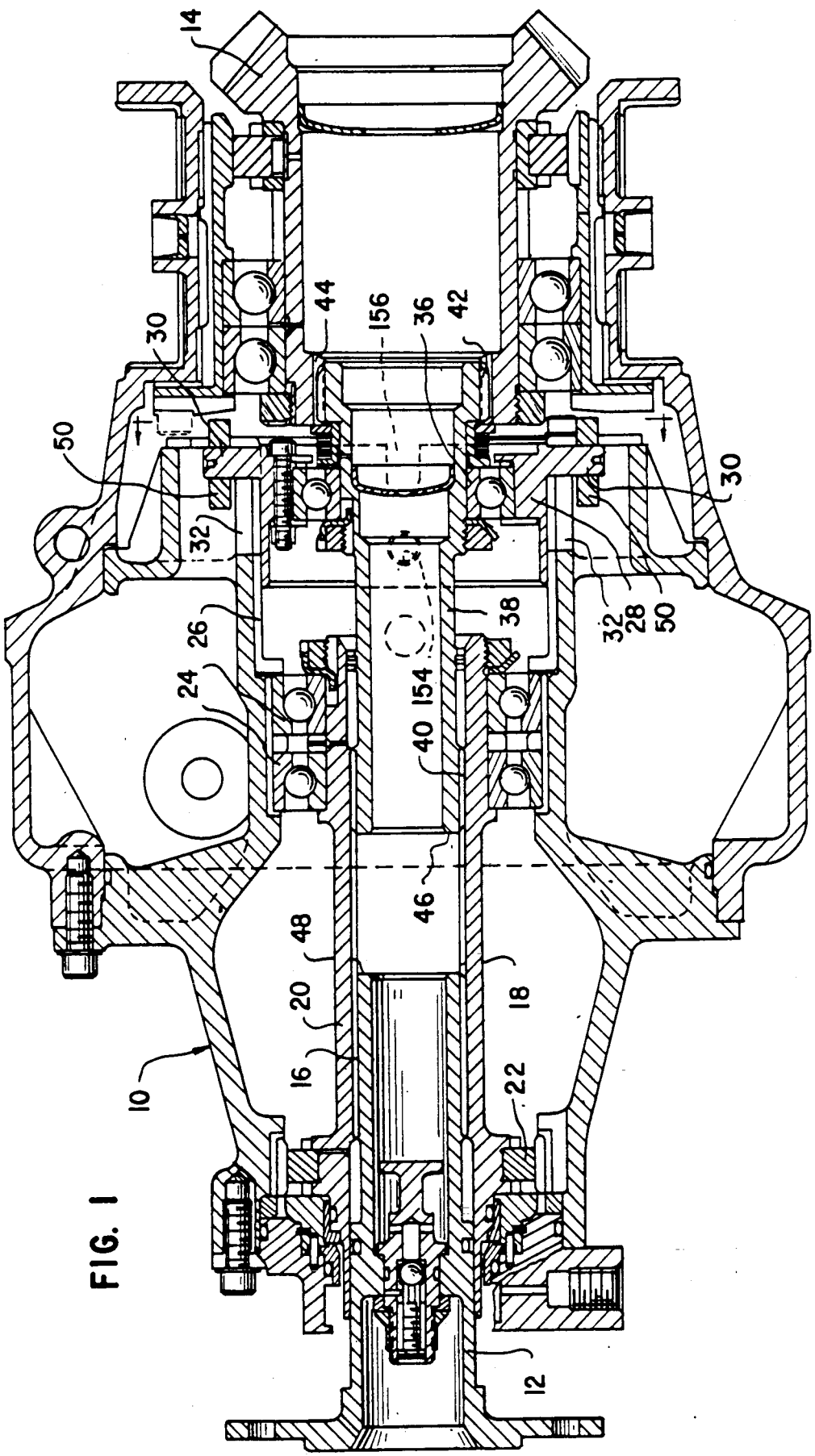
FIG. 1 is a sectional view of a mechanical power path such as might be found in an AMAD and embodying a connect-disconnect coupling made according to the invention.

An exemplary embodiment of the invention is illustrated in the drawings and with reference to FIG. 1 is seen to include a housing, generally designated 10 which, at one end journals a shaft 12 which, in the exemplary embodiment, is adapted to be connected to the power takeoff of an aircraft main turbine engine.

Oppositely of the shaft 12 is a bevel gear 14 which typically will form part of a transmission whereby accessories such as hydraulic pumps, electric generators, etc. are driven.

The shaft 12, within the housing, includes a spline 16 which is received in a spline 18 on the interior of a hollow shaft 20. The shaft 20 is journalled as by bearings 22 and 24, the latter being captivated by a guide tube 26.

Within the guide tube 26 there is located a throw off sleeve or carrier 28. The carrier 28 includes oppositely directed trunions 30 which extend through slots 32 in the guide tube 26. The carrier 28 reciprocates within the guide tube 26 from the position illustrated in FIG. 1 to one wherein the trunions are closely adjacent the ends of the slots 32.

The carrier 28 mounts a bearing 36 which in turn journals a coupling shaft 38 within the housing 10 coaxial with the shaft 20. As viewed in FIG. 1, at its left hand end, the coupling shaft 28 includes a spline 40 engaged with the spline 18 within the hollow shaft 20. At its opposite ends, the coupling shaft 28 includes a spline 42 which is engaged with an internal spline 44 within the bevel gear 14. Splines 42 and 44 both having leading tapers on their tooth ends to facilitate reengagement of spline 42 to 44 during the connect operation.

It will be observed that the end 46 of the coupling shaft 38 nearest to the shaft 12 is spaced a considerable distance from the adjacent end 48 of the shaft 12. The distance is such that the carrier 28 may make a full excursion to the left as viewed in FIG. 1 without such movement being halted by contacts between the shaft ends 46 and 48. It will also be noted that the axial length of the splines 42 and 44 is that such movement will fully disengage one from the other, thereby decoupling the bevel gear 14 from the shaft 12.

To recouple the same, the coupling shaft 38 is moved to the right to once again mesh the splines 42 and 44. Splines 42 and 44 both having lead in tapers on their tooth ends to facilitate reengagement of spline 42 to 44 during the connect operation.

To move the carrier 28, and thus the coupling shaft 38 between such positions, the trunions 30 are engaged by arms 50 of a yoke 52.

The yoke 52 is pivoted by a pivot pin 54 which in turn is mounted on lugs 56 formed on the exterior of the housing 10 as best seen in FIGS. 2 and 3. The yoke 52 is in fact part of a bell crank which includes an actuating arm 58 (FIG. 4) which may be bifurcated as seen in FIG. 3 and formed on one of the arms 50. A pin 60 is mounted to the arm 58.

As can be seen in FIGS. 3 through 6 inclusive, the ends of the arms 50 are slotted as at 62 to pivotally and slidably receive the trunions 30. Thus, the trunions 30 may move in a completely straight line path even though the ends of the arms 50 are moving in an arcuate path.

A direction reversing lever or link 64 is also included in the system. The link 64 is pivoted as at 66 intermediate its ends 68 and 70 and both such ends 68 and 70 are slotted as respectively illustrated at 72 and 74. The pin 60 is received within the slot 72 while a pin 76 is located in the slot 74. Again, the purpose of the slots 68 and 70 is to provide a controlled fit, slidable and pivotal connection to accommodate the fact that the ends of the respective links are moving in different arcuate or linear paths.

Figure 4:
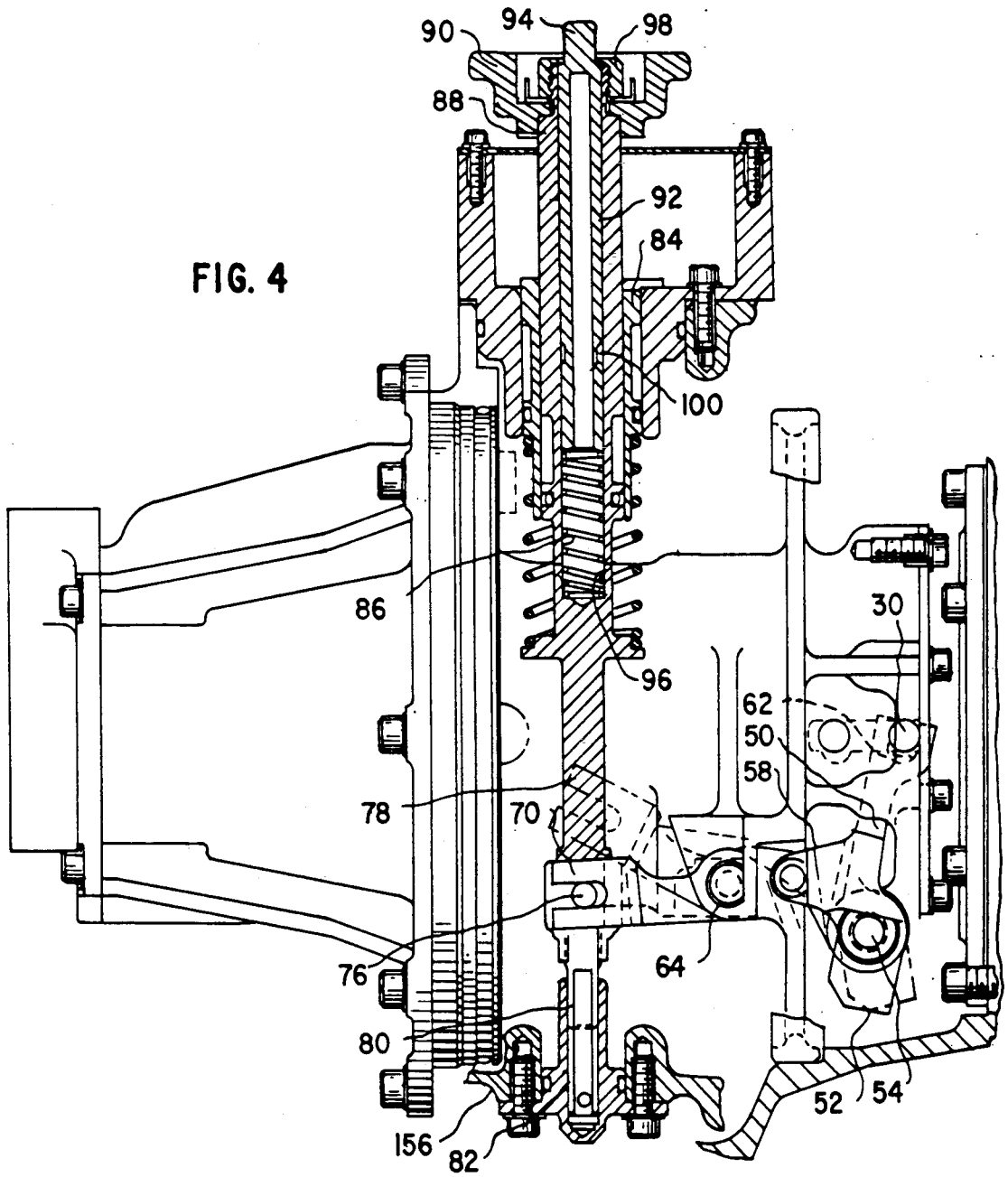
FIG. 4 is a sectional view taken oppositely of the showing in FIG. 1.
Figure 5:
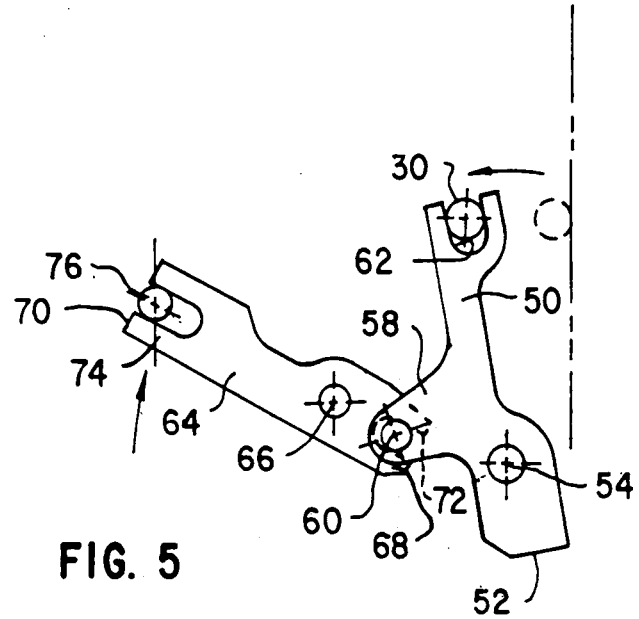
FIG. 5 is a schematic showing a motion converting mechanism and the relative position of its components when the coupling is in a decoupled position.
Figure 6:
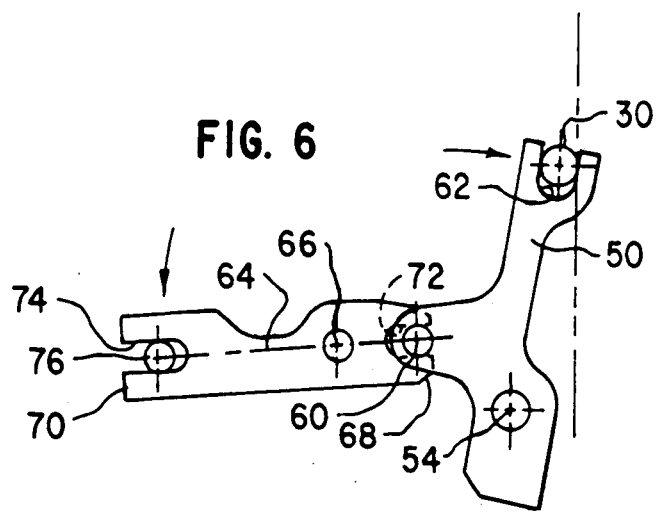
FIG. 6 is a view similar to FIG. 5 but showing the relative configuration of the components when the coupling is coupled.
Figure 7:
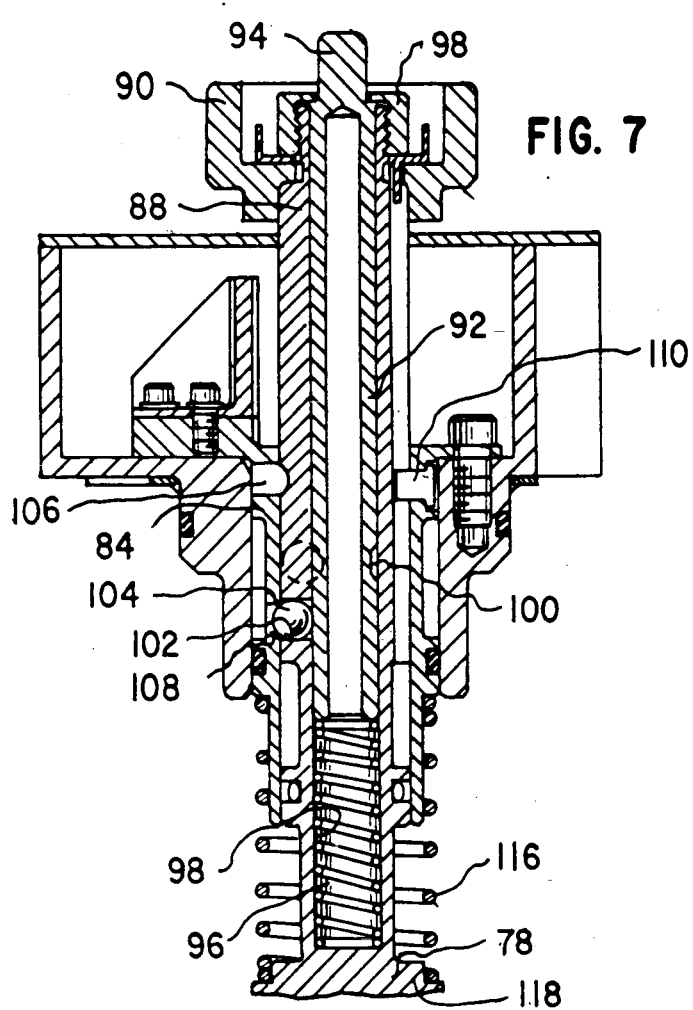
FIG. 7 is an enlarged, fragmentary view of a detent mechanism.

As can be seen from FIGS. 5 and 6, the yoke 52 is pivoted between coupled and decoupled positions dependent upon the position of the reversing lever 64 which in turn is controlled by the position of the pin 76. As best seen in FIG. 4, the pin 76 is carried by a reciprocal actuator 78. One end 80 of the actuator 78 is received in a guide bushing 82 mounted to the outer housing 156. A guide sleeve 84 opposite the guide bushing 82 receives the other end of the actuator 78. Thus, the actuator 78 is mounted for reciprocating movement within the outer housing 156.

For at least a part of its length, the actuator 78 includes an internal bore 86 which opens toward an end 88 of the actuator 78 which in turn mounts a T-handle 90. Reciprocally received within the bore 86 is a release rod 92 for a detent mechanism to be described. The release rod extends out of the end 88 of the actuator 78 to terminate in a button 94 projecting from the handle 90. Thus, the handle 90 may be grasped with the fingers of a hand and the button 94 operated with the thumb.

A biasing spring 96 within the bore 86 bears against the release rod 92 and biases it against a stop cap 98 carried by the end 88 of the actuator. The release rod 92 also includes a peripheral groove 100 that forms part of a ball detent mechanism.

It will be recalled from the previous discussion that part of the actuator 78 is hollow and, in the vicinity of the guide sleeve 84, includes a radial hole 102 which receives a ball 104. The diameter of the ball 104 is somewhat greater than the wall thickness of the actuator 78 at that location and the hole 102 is of slightly larger diameter yet so that the ball 104 may freely move therein.

The guide sleeve 84 includes axially spaced first and second detent holes 106 and 108 on its interior surface which are somewhat smaller in diameter than the diameter of the ball 104. The detent holes 106 and 108 are on an axial line so that upon reciprocation of the actuator 78, the hole 102, and thus the ball 104, may be brought into alignment with either of the detent holes 106 or 108. To assure this alignment occurs, a stationary pin 110 secured to the guide sleeve 84 is received within a slot in the actuator 78.

Considering the configuration of components illustrated in FIGS. 4–7, it will be appreciated that when the ball 104 is in the detent hole 108, the pin 76 will be in its uppermost position which corresponds to the coupled position schematically illustrated in FIG. 6. Conversely, when the actuator 78 is moved so as to align the ball 104 with the detent hole 106, the pin 76 will be at its lowermost position, corresponding to the uncoupled position as illustrated in FIG. 5.

The detent mechanism thus described provides for positive retention in either of the two positions just mentioned. More particularly, when a part of the release rod 92 not including the groove 100 is aligned with the hole 102, given the relationship of the diameter of the ball 104 to the wall thickness of the actuator 78, part of the ball will be trapped radially outward and into one of the detent holes 108 and an interference fit will exist preventing any axial shifting of the actuator 78. However, to disengage the positive detent mechanism, it is only necessary to exert an upward force on the button 94 against the bias of the spring 96 to bring the groove 100 into alignment with the hole 102. At this point, the ball 104 may cam or back out of the detent holes 106 or 108, as the case may be, and into the recess 100 by a camming action as it is attempted to move the actuator 78 in one axial direction or another. At this time then, axial force may be exerted on the handle 90 to shift the actuator 78 to the other position. As soon as that position is achieved, the ball 104 will be free to enter the other one of the detent holes 106, or 108 and the spring 96 will restore the release rod 92 to the position illustrated in FIG. 7.

It is also noted that a compression coil spring 116 may be provided and be interposed between a shoulder 118 carried by the actuator 78 and the guide sleeve 84 to exert a biasing force on the actuator 78 that tends to return the same toward the engaged or coupled position.

Figure 8:
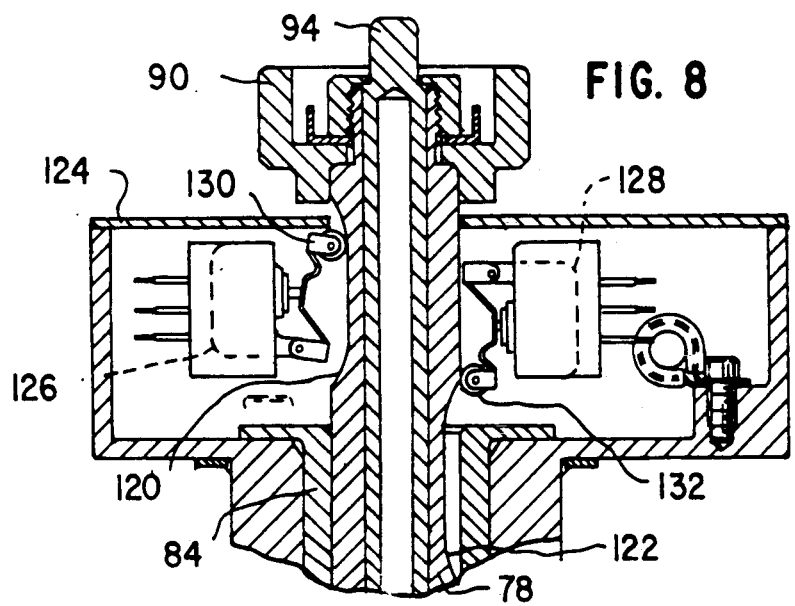
FIG. 8 is a view similar to FIG. 7 and illustrating switches that may be utilized to illustrate the condition of the couplings.

In many instances, it is desirable to provide some sort of means of signalling the condition of the coupling, that is, whether it is in the coupled or decoupled position. FIG. 8 illustrates a means whereby such may be achieved in an operation made according to the invention. More particularly, recesses 120 and 122 may be located at appropriate axial positions along the length of the actuator 78 and preferably near the handle 90 within a subhousing 124. Suitable bracketry (not shown) within the subhousing 124 mounts limitswitches 126 and 128 having respective actuators 130 and 132 disposed within the grooves or slots 120 and 122, respectively. As a consequence, as the actuator is shifted within the guide bushing 84, the actuators 130 and 132 for the switches 126 and 128 will change positions corresponding to the depths of the grooves 120 and 122 to provide the desired signalling.

Figure 9:
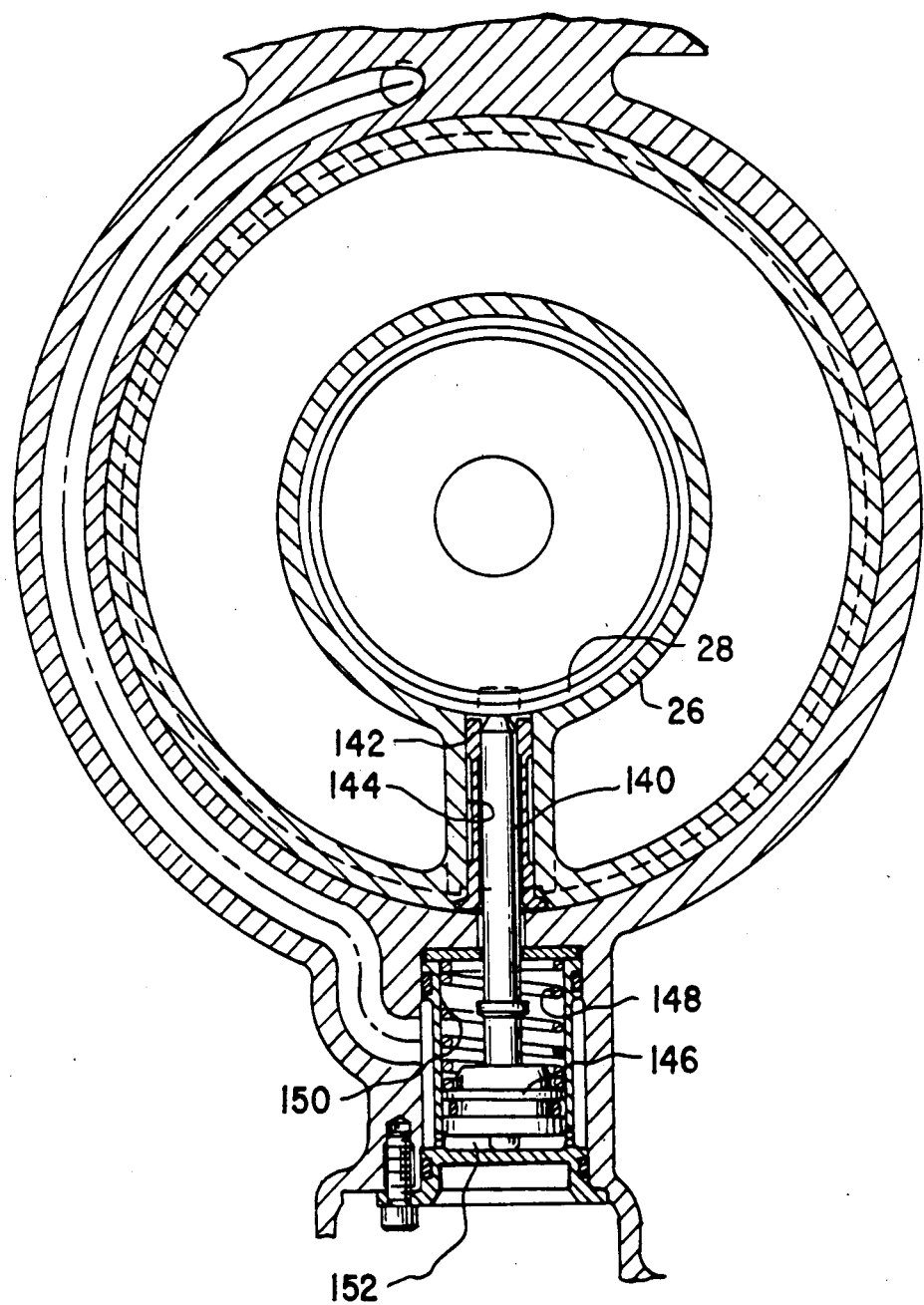
FIG. 9 is a sectional view illustrating a locking mechanism to override the action of the coupling device.

Frequently it is also desirable to provide a positive lock for the system so as to prevent undesired coupling or decoupling. A means for accomplishing such is illustrated in FIGS. 1 and 9. Referring to FIG. 9, a radially movable pin 140 is reciprocally received in a guide sleeve 142 located within a bore 144 in the housing 10 that extends to the guide tube 26. The pin 140 is connected to a piston 146 which is spring biased by a spring 148 within a cylinder 150 towards a radially outer position. Thus, the spring 148 acts to bias the pin 140 away from the guide tube 26. Conversely, when fluid under pressure is applied to the space 152 below the piston 146 as illustrated in FIG. 9, the rod 140 may be elevated so as to extend inwardly of the guide tube 26.

The carrier 28 may be provided with one or more openings or slots. As seen in FIG. 1 and 9, a pin receiving opening 154 is located intermediate the ends of the carrier 28, while one end of the carrier 28 includes an axially opening slot 156.

By applying fluid under pressure to the piston 146 with the coupling shaft 38 in the coupled position, the pin will enter the opening 154 to prevent the carrier 28 from being shifted thereby locking the assembly in the coupled position. Conversely, if the coupling shaft 38 is moved to the left from the position illustrated in FIG. 1 and corresponding to a decoupled position, the pin 140 may enter the slot 156 to hold the elements in a decoupled position.

From the foregoing, it will be appreciated that a manually operated connect-disconnect coupling made according to the invention is simple and easily operated. Moreover, it may be made readily accessible in tight spaces by reason of the location of the handle 90.

What is claimed is:

1. A manual connect-disconnect operator for a power transmission path comprising:
   a coupling member;
   a translatable carrier journalling said coupling member for rotation about an axis and mounting said coupling member for axial movement along said axis between connect and disconnect positions;
   a yoke mounted on a pivot and connected to said carrier for translating the carrier to move the coupling member upon pivotal movement of said yoke;
   a manual actuator mounted for reciprocating movement;
   detent means operable to maintain said carrier in either of said positions;
   a reciprocal release mechanism for said detent means and carried by said actuator; and
   a reciprocating motion to rotary motion converting mechanism interconnecting said actuator and said yoke.

2. The manual operator of claim 1 wherein said detent means is a ball detent mechanism.

3. The manual operator of claim 2 wherein said manual actuator is hollow and includes a radial hole; a ball movable in said hole; a guide sleeve receiving said actuator and mounting the same for said reciprocating movement; said sleeve including two spaced detent holes, each alignable with said radial hole to partially receive said ball; and said release mechanism being reciprocable to urge the ball into a selected one of said detent holes and to allow said ball to be cammed from either of said detent holes into said radial hole.

4. The manual operator of claim 3 wherein said release mechanism comprises a release rod reciprocally received in said actuator and having a groove alignable with said radial hole oppositely of said guide sleeve detent holes to allow said ball to be cammed therefrom; said release rod, when said release rod groove is not aligned with said radial hole, urging said ball into one of said guide sleeve detent holes.

5. The manual operator of claim 4 including a spring interconnecting said release rod and said actuator and biasing said release rod so as to move said release rod groove out of alignment with said hole.

6. The manual operator of claim 5 wherein said actuator terminates in a handle and said release rod terminates in a button within said handle.

7. The manual operator of claim 1 wherein said converting mechanism comprises a pivoted lever having an end slidably and pivotally connected to said actuator.

8. The manual operator of claim 7 wherein said yoke is part of a bell crank having first and second arms; said first arm being connected to said carrier and said second arm being slidably and pivotally connected to said lever.

9. A manual connect-disconnect operator for a power transmission path comprising:
   a coupling member;
   a translatable carrier journalling said coupling member for rotation about an axis and mounting said coupling member for axial movement along said axis between connect and disconnect positions;
   a throw out element movable mounted on, adjacent to and connected to said carrier for translating the carrier to move the coupling member upon movement thereof;

an actuator for moving said throw out element; and a detent mechanism for positively holding said actuator in position corresponding to said connect and disconnect positions and including a guide sleeve movably mounting said actuator and a release rod movably mounted within said actuator; a hole within said actuator and freely receiving a ball; first and second, spaced detent holes in said guide sleeve and respectively alignable with said hole and each adapted to partially receive said ball, and a groove in said release rod and alignable with said hole to permit the ball to reside entirely within said hole and said release rod groove to allow said actuator to be moved relative to said guide sleeve.

10. A manual connect-disconnect operator for a power transmission path comprising:

a coupling member;

a translatable carrier journalling said coupling member for rotation about an axis and mounting said coupling member for axial movement along said axi between connect and disconnect positions;

a bell crank mounted on a pivot and having a yoke connected to said carrier for translating the carrier to move the coupling member upon pivotal movement of the bell crank, and an actuating arm;

a lever pivoted intermediate its ends and having one end slidably and rotatably connected to said actuating arm; and a reciprocally mounted actuator loosely connected to the other end of said lever.

11. The manual operator of claim 10 wherein said lever has slotted ends receiving pins respectively on said actuating arm and said actuator to provide the slidable and rotatable connections.

* * * * *